United States Patent
Li et al.

(10) Patent No.: US 11,263,476 B2
(45) Date of Patent: Mar. 1, 2022

(54) UNSUPERVISED REPRESENTATION LEARNING WITH CONTRASTIVE PROTOTYPES

(71) Applicant: salesforce.com, inc., San Francisco, CA (US)

(72) Inventors: Junnan Li, Singapore (SG); Chu Hong Hoi, Singapore (SG)

(73) Assignee: salesforce.com, inc., San Francisco, CA (US)

(*) Notice: Subject to any disclaimer, the term of this patent is extended or adjusted under 35 U.S.C. 154(b) by 104 days.

(21) Appl. No.: 16/870,621

(22) Filed: May 8, 2020

(65) Prior Publication Data
US 2021/0295091 A1    Sep. 23, 2021

Related U.S. Application Data

(60) Provisional application No. 62/992,004, filed on Mar. 19, 2020.

(51) Int. Cl.
*G06K 9/62* (2006.01)
*G06T 7/73* (2017.01)

(52) U.S. Cl.
CPC ......... *G06K 9/6218* (2013.01); *G06K 9/6259* (2013.01); *G06T 7/73* (2017.01); *G06T 2207/20084* (2013.01)

(58) Field of Classification Search
CPC ...... G06K 9/6218; G06K 9/6259; G06T 7/73; G06T 2207/20084
USPC ....................................................... 382/225
See application file for complete search history.

(56) References Cited

U.S. PATENT DOCUMENTS

| | | | |
|---|---|---|---|
| 6,211,971 B1* | 4/2001 | Specht | G06T 5/009 345/589 |
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |

(Continued)

OTHER PUBLICATIONS

Wu, Z., Y. Xiong, S. X. Yu, et al. Unsupervised feature learning via non-parametric instance discrimination. In CVPR, pp. 3733-3742. 2018.

(Continued)

*Primary Examiner* — Jerome Grant, II
(74) *Attorney, Agent, or Firm* — Haynes and Boone, LLP

(57) ABSTRACT

The system and method are directed to a prototypical contrastive learning (PCL). The PCL explicitly encodes the hierarchical semantic structure of the dataset into the learned embedding space and prevents the network from exploiting low-level cues for solving the unsupervised learning task. The PCL includes prototypes as the latent variables to help find the maximum-likelihood estimation of the network parameters in an expectation-maximization framework. The PCL iteratively performs an E-step for finding prototypes with clustering and M-step for optimizing the network on a contrastive loss.

20 Claims, 6 Drawing Sheets

```
Algorithm 1: Prototypical Contrastive Learning.
1  Input: encoder f_θ, training dataset X, number of clusters K = {k_m}_{m=1}^M
2  θ' = θ                                              // initialize momentum encoder
3  while not MaxEpoch do
4      V' = f_θ'(X)                                   // get momentum features for all training data
5      for m = 1 to M do
6          C^m = k-means(V', k_m)                     // cluster V' into k_m clusters, return prototypes
7          φ_m = Concentration(C^m, V')               // estimate the distribution concentration
                                                       around each prototype with Equation 12
8      end
9      for x in DataLoader(X) do                      // load a minibatch x
10         v = f_θ(x), v' = f_θ'(x)                   // forward pass through encoder and momentum encodeer
11         L_ProtoNCE(v, v', {C^m}_{m=1}^M, {φ_m}_{m=1}^M)  // calculate loss with Equation 11
12         θ = SGD(L_ProtoNCE, θ)                     // update encoder parameters
13         θ' = 0.999 * θ' + 0.001 * θ                // update momentum encoder
14     end
15 end
```

(56) References Cited

U.S. PATENT DOCUMENTS

| | | | |
|---|---|---|---|
| 10,592,767 | B2 | 3/2020 | Trott et al. |
| 10,950,337 | B1* | 3/2021 | Shin .................. A61B 6/03 |
| 2003/0118233 | A1* | 6/2003 | Olsson .................. G06K 9/38 382/173 |
| 2007/0160357 | A1* | 7/2007 | Lin .................. G03B 7/097 396/65 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0268287 | A1 | 9/2018 | Johansen et al. |
| 2018/0268298 | A1 | 9/2018 | Johansen et al. |
| 2018/0336453 | A1 | 11/2018 | Merity et al. |
| 2018/0373682 | A1 | 12/2018 | McCann et al. |
| 2018/0373987 | A1 | 12/2018 | Zhang et al. |
| 2019/0130218 | A1 | 5/2019 | Albright et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0188568 | A1 | 6/2019 | Keskar et al. |
| 2019/0213482 | A1 | 7/2019 | Socher et al. |
| 2019/0251431 | A1 | 8/2019 | Keskar et al. |
| 2019/0258714 | A1 | 8/2019 | Zhong et al. |
| 2019/0258901 | A1 | 8/2019 | Albright et al. |
| 2019/0258939 | A1 | 8/2019 | Min et al. |
| 2019/0286073 | A1 | 9/2019 | Asl et al. |
| 2019/0295530 | A1 | 9/2019 | Asl et al. |
| 2019/0355270 | A1 | 11/2019 | McCann et al. |
| 2019/0362020 | A1 | 11/2019 | Paulus et al. |
| 2020/0005765 | A1 | 1/2020 | Zhou et al. |
| 2020/0057805 | A1 | 2/2020 | Lu et al. |
| 2020/0065651 | A1 | 2/2020 | Merity et al. |
| 2020/0084465 | A1 | 3/2020 | Zhou et al. |
| 2020/0089757 | A1 | 3/2020 | Machado et al. |
| 2020/0090033 | A1 | 3/2020 | Ramachandran et al. |
| 2020/0090034 | A1 | 3/2020 | Ramachandran et al. |
| 2020/0103911 | A1 | 4/2020 | Ma et al. |
| 2020/0104643 | A1 | 4/2020 | Hu et al. |
| 2020/0104699 | A1 | 4/2020 | Zhou et al. |
| 2020/0105272 | A1 | 4/2020 | Wu et al. |
| 2020/0117854 | A1 | 4/2020 | Lu et al. |
| 2020/0117861 | A1 | 4/2020 | Bradbury |
| 2020/0142917 | A1 | 5/2020 | Paulus |
| 2020/0349736 | A1* | 11/2020 | Mustafi .............. G06K 9/00993 |
| 2021/0012166 | A1* | 1/2021 | Braley .................. G06K 9/6271 |
| 2021/0150696 | A1* | 5/2021 | Bidault .................. G06N 3/08 |

OTHER PUBLICATIONS

Ye, M., X. Zhang, P. C. Yuen, et al. Unsupervised embedding learning via invariant and spreading instance feature. In CVPR, pp. 6210-6219. 2019.

He, K., H. Fan, Y. Wu, et al. Momentum contrast for unsupervised visual representation learning. arXiv preprint arXiv:1911.05722, 2019.

Misra, I., L. van der Maaten. Self-supervised learning of pretext-invariant representations. arXiv preprint arXiv:1912.01991, 2019.

Hjelm, R. D., A. Fedorov, S. Lavoie-Marchildon, et al. Learning deep representations by mutual information estimation and maximization. In ICLR. 2019.

Oord, A. v. d., Y. Li, O. Vinyals. Representation learning with contrastive predictive coding. arXiv preprint arXiv:1807.03748, 2018.

Tian, Y., D. Krishnan, P. Isola. Contrastive multiview coding. arXiv preprint arXiv:1906.05849, 2019.

Chen, T., S. Kornblith, M. Norouzi, et al. A simple framework for contrastive learning of visual representations. arXiv preprint arXiv:2002.05709, 2020.

Gutmann, M., A. Hyvärinen. Noise-contrastive estimation: A new estimation principle for unnormalized statistical models. In AISTATS, pp. 297-304. 2010.

Zhuang, C., A. L. Zhai, D. Yamins. Local aggregation for unsupervised learning of visual embeddings. In ICCV, pp. 6002-6012. 2019.

Tschannen, M., J. Djolonga, P. K. Rubenstein, et al. On mutual information maximization for representation learning. In ICLR. 2020.

Saunshi, N., O. Plevrakis, S. Arora, et al. A theoretical analysis of contrastive unsupervised representation learning. In ICML, pp. 5628-5637. 2019.

Xie, J., R. B. Girshick, A. Farhadi. Unsupervised deep embedding for clustering analysis. In ICML, pp. 478-487. 2016.

Yang, J., D. Parikh, D. Batra. Joint unsupervised learning of deep representations and image clusters. In CVPR, pp. 5147-5156. 2016.

Liao, R., A. G. Schwing, R. S. Zemel, et al. Learning deep parsimonious representations. 30th Conference on Neural Information Processing Systems (NIPS 2016), Barcelona, Spain, pp. 5076-5084. 2016.

Yang, B., X. Fu, N. D. Sidiropoulos, et al. Towards k-means-friendly spaces: Simultaneous deep learning and clustering. arXiv:1610.04794v2 [cs.LG] Jun. 13, 2017.

Chang, J., L. Wang, G. Meng, et al. Deep adaptive image clustering. In ICCV, pp. 5880-5888. 2017.

Ji, X., J. F. Henriques, A. Vedaldi. Invariant information clustering for unsupervised image classification and segmentation. In ICCV, pp. 9865-9874. 2019.

Caron, M., P. Bojanowski, A. Joulin, et al. Deep clustering for unsupervised learning of visual features. In ECCV, pp. 139-156. 2018.

Pathak, D., P. Krähenbühl, J. Donahue, et al. Context encoders: Feature learning by inpainting. In CVPR, pp. 2536-2544. 2016.

Zhang, R., P. Isola, A. A. Efros. Colorful image colorization. In ECCV, pp. 649-666. 2016.

Zhang, R., et al. Split-brain autoencoders: Unsupervised learning by cross-channel prediction. In CVPR, pp. 645-654. 2017.

Doersch, C., A. Gupta, A. A. Efros. Unsupervised visual representation learning by context prediction. In ICCV, pp. 1422-1430. 2015.

Noroozi, M., P. Favaro. Unsupervised learning of visual representations by solving jigsaw puzzles. In ECCV, pp. 69-84. 2016.

Dosovitskiy, A., J. T. Springenberg, M. A. Riedmiller, et al. Discriminative unsupervised feature learning with convolutional neural networks. In NIPS, pp. 766-774. 2014.

Gidaris, S., P. Singh, N. Komodakis. Unsupervised representation learning by predicting image rotations. In ICLR. 2018.

Caron, M., P. Bojanowski, J. Mairal, et al. Unsupervised pre-training of image features on non-curated data. In ICCV, pp. 2959-2968. 2019.

Zhang, L., G. Qi, L. Wang, et al. AET vs. AED: unsupervised representation learning by auto-encoding transformations rather than data. In CVPR. 2019.

Lücke, J., D. Forster. k-means as a variational EM approximation of gaussian mixture models. Pattern Recognition Letters, 125:349-356, 2019.

Deng, J., W. Dong, R. Socher, et al. Imagenet: A large-scale hierarchical image database. In CVPR, pp. 248-255. 2009.

Ross, B. C. Mutual information between discrete and continuous data sets. PloS one, 9(2), 2014.

Snell, J., K. Swersky, R. S. Zemel. Prototypical networks for few-shot learning. In NIPS, pp. 4077-4087. 2017.

Hénaff, O. J., A. Razavi, C. Doersch, et al. Data-efficient image recognition with contrastive predictive coding. arXiv preprint arXiv:1905.09272, 2019.

He, K., X. Zhang, S. Ren, et al. Deep residual learning for image recognition. In CVPR, pp. 770-778. 2016.

Johnson, J., M. Douze, H. Jégou. Billion-scale similarity search with gpus. arXiv preprint arXiv:1702.08734, 2017.

(56) References Cited

OTHER PUBLICATIONS

Goyal, P., D. Mahajan, A. Gupta, et al. Scaling and benchmarking self-supervised visual representation learning. In ICCV, pp. 6391-6400. 2019.

Zhou, B., À. Lapedriza, J. Xiao, et al. Learning deep features for scene recognition using places database. In NIPS, pp. 487-495. 2014.

Everingham, M., L. V. Gool, C. K. I. Williams, et al. The pascal visual object classes (VOC) challenge. International Journal of Computer Vision, 88(2):303-338, 2010.

Zhai, X., A. Oliver, A. Kolesnikov, et al. S4I: Self-supervised semi-supervised learning. In ICCV, pp. 1476-1485. 2019.

Miyato, T., S. Maeda, M. Koyama, et al. Virtual adversarial training: A regularization method for supervised and semi-supervised learning. IEEE Trans. Pattern Anal. Mach. Intell., 41(8):1979-1993, 2019.

Donahue, J., K. Simonyan. Large scale adversarial representation learning. In NeurIPS, pp. 10541-10551. 2019.

Asano, Y. M., C. Rupprecht, A. Vedaldi. Self-labelling via simultaneous clustering and representation learning. In ICLR. 2020.

Lim, S., I. Kim, T. Kim, et al. Fast autoaugment. In NeurIPS, pp. 6662-6672. 2019.

Ren, S., K. He, R. B. Girshick, et al. Faster R-CNN: towards real-time object detection with region proposal networks. In NIPS, pp. 91-99. 2015.

He, K., R. B. Girshick, P. Dollár. Rethinking imagenet pre-training. arXiv preprint arXiv:1811.08883, 2018.

Fan, R., K. Chang, C. Hsieh, et al. LIBLINEAR: A library for large linear classification. JMLR, 9:1871-1874, 2008.

Chen, K., J. Wang, J. Pang, et al. MMDetection: Open mmlab detection toolbox and benchmark. arXiv preprint arXiv:1906.07155, 2019.

\* cited by examiner

Algorithm 1: Prototypical Contrastive Learning.

Input: encoder $f_\theta$, training dataset $X$, number of clusters $K = \{k_m\}_{m=1}^{M}$ 1: $\theta' = \theta$                                                                                          // initialize momentum encoder
2: while not MaxEpoch do
3:     $V' = f_{\theta'}(X)$                                                               // get momentum features for all training data
4:     for $m = 1$ to $M$ do
5:         $C^m = k\text{-means}(V', k_m)$                              // cluster $V'$ into $k_m$ clusters, return prototypes
6:         $\phi_m = \text{Concentration}(C^m, V')$                   // estimate the distribution concentration around each prototype with Equation 12
7:     end
8:     for $x$ in Dataloader($X$) do
9:                                                                      // load a minibatch $x$
10:         $v = f_\theta(x), v' = f_{\theta'}(x)$                     // forward pass through encoder and momentum encoder
11:         $\mathcal{L}_{\text{ProtoNCE}}(v, v', \{C^m\}_{m=1}^{M}, \{\mu_m\}_{m=1}^{M})$ // calculate loss with Equation 11
12:         $\theta = \text{SGD}(\mathcal{L}_{\text{ProtoNCE}}, \theta)$ // update encoder parameters
13:         $\theta' = 0.999 * \theta' + 0.001 * \theta$                // update momentum encoder
14:     end
15: end

*FIG. 5*

UNSUPERVISED REPRESENTATION LEARNING WITH CONTRASTIVE PROTOTYPES

RELATED APPLICATION

This application claims priority to U.S. Provisional Patent Application No. 62/992,004, filed Mar. 19, 2020, which is incorporated by reference herein in its entirety.

TECHNICAL FIELD

The embodiments relate generally to representation learning, and more specifically to a prototypical contrastive learning using a prototypical contrastive learning framework.

BACKGROUND

Most existing techniques for unsupervised or self-supervised learning fall into three categories: instance-wise contrastive learning, unsupervised clustering, and learning from pre-tasks.

The instance wise contrastive learning may learn an embedding space where samples (e.g. crops) from the same instance (e.g. an image) are pulled closer and samples from different instances are pushed apart. To construct the contrastive loss for a mini-batch of samples, instance-wise contrastive learning may generate positive instance features and negative instance features for each sample. To generate the instance features, the instance-wise contrastive learning may use a memory bank approach that stores the features of all samples calculated in the previous step and selects features from the memory bank to form positive and negative pairs. To generate instance features, the instance-wise contrastive learning may also use an end-to-end approach that generates instance features using all samples within the current mini-batch. In the end-to-end approach, two encoders may be applied to the mini-batch, one encoder on the original samples, and the other encoder on the augmented version of the samples.

The instance-wise contrastive learning has various drawbacks. The task of instance discrimination may be solved by exploiting low-level differences between images. This means that the learned embeddings may not capture higher-level semantic information. Also, instance-wise learning samples a sufficiently large number of negative instances, which inevitably yields negative pairs that share similar semantic meaning and should be closer in the embedding space. However, the negative pairs are undesirably pushed apart by the contrastive loss. In other words, the instance wise discrimination learns an embedding space that only preserves the local smoothness around each instance but ignores the global semantic structure of the dataset.

The techniques based on clustering jointly learn image embeddings and cluster assignments. The clustering techniques, however may not learn transferable representations from a large scale of images. The DeepCluster clustering technique may learn from millions of images by performing iterative clustering and unsupervised representation learning. In DeepCluster, the cluster assignments may be pseudo-labels and a classification objective may be optimized. The deficiencies of this approach are that the high-dimensional features from the penultimate layer of a ConvNet are not optimal for clustering and need to be PCA-reduced. Another deficiency is that an additional linear classification layer is frequently re-initialized which interferes with representation learning.

Other techniques are self-supervised learning methods that focus on training deep neural networks to solve pretext tasks that lead to good image representations being learned. These tasks usually involve hiding certain information about the input and training the network to recover the missing information. Example tasks may include image inpainting, colorization, prediction of patch orderings and image transformations. However, these pretext tasks exploit specific structures of visual data and may be difficult to generalize to other domains.

BRIEF DESCRIPTION OF THE DRAWINGS

FIG. 5 is a diagram of an Expectation-Maximization algorithm for training the prototypical contrastive learning framework, according to some embodiments.

DETAILED DESCRIPTION

Figure 1:
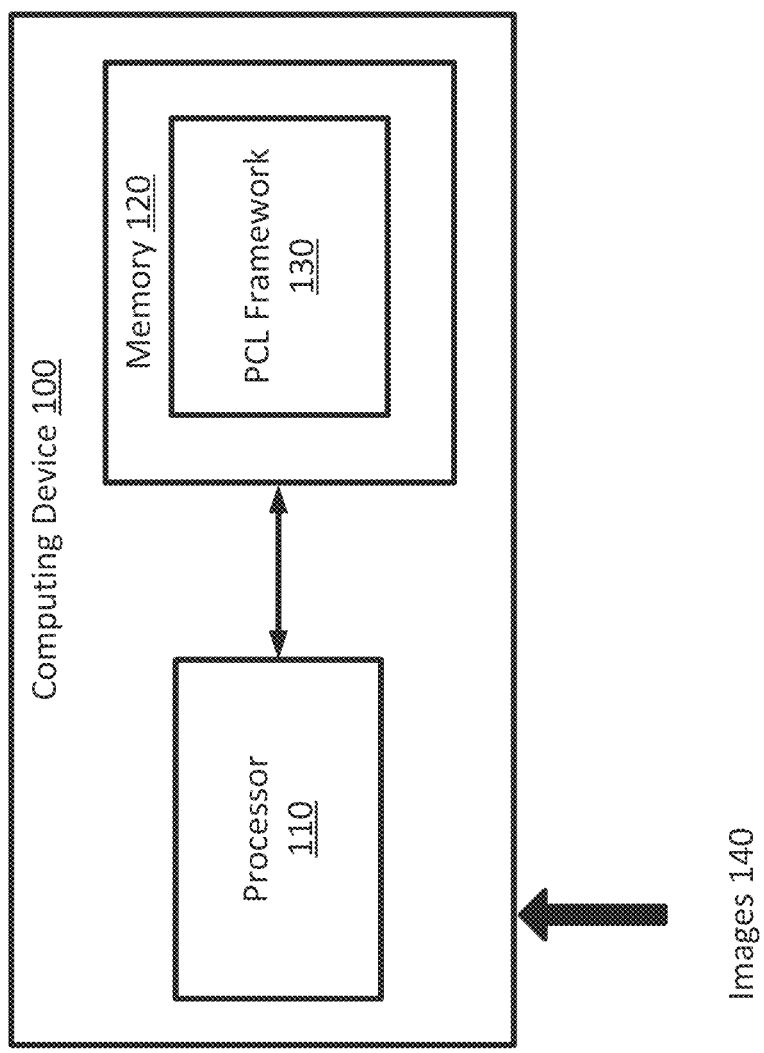
FIG. 1 is a simplified diagram of a computing device for implementing a prototypical contrastive learning framework, according to some embodiments.

Unsupervised visual representation learning aims to learn image representations from pixels themselves and without relying on semantic annotations. Recent developments in unsupervised representation learning are largely driven by the task called instance discrimination. Methods based on the instance discrimination usually consist of two key components: image transformation and contrastive loss. Image transformation aims to generate multiple embeddings that represent the same image, by data augmentation, patch perturbation, or by using momentum features. The contrastive loss, which may be in the form of a noise contrastive estimator, aims to bring closer samples from the same instance and separate samples from different instances. Instance-wise contrastive learning leads to an embedding space where all instances are well-separated, and each instance is locally smooth (i.e. input perturbation leads to similar representations).

Despite their improved performance, methods based on instance discrimination share a common fundamental weakness: the semantic structure of data is not encoded by the learned representations. This problem arises because instance-wise contrastive learning considers two samples to be a negative pair as long as they are from different instances, regardless of the semantic similarity between instances. The problem is magnified by the fact that thousands of negative samples are generated to form the contrastive loss, leading to many negative pairs that share similar semantic meaning but are undesirably pushed apart in the embedding space.

The embodiments are directed to a prototypical contrastive learning (PCL) framework for unsupervised representation learning. The PCL framework explicitly encodes the semantic structure into the embedding space. A prototype in the PCL framework may be defined as a representative embedding for a group of semantically similar instances. Each instance may be assigned to several prototypes of different granularity. The PCL framework may also construct a contrastive loss which may enforce the embedding of a sample to be more similar to its assigned prototypes compared to other prototypes. In practice, the PCL framework may find prototypes by performing standard clustering on the embeddings.

In some embodiments, the PCL framework may use a bilevel Expectation-Maximization (E-M) algorithm. The E-M algorithm may find parameters of a deep neural network (DNN) that best describe the data by iteratively approximating and maximizing the likelihood function. The E-M algorithm may include additional latent variables, such as prototypes and instance assignments. The E-M algorithm may estimate the latent variables in the E-step of the E-M algorithm by performing k-means clustering. In the M-step of the E-M algorithm, the E-M algorithm may update the network parameters by minimizing the proposed contrastive loss. A proposed contrastive loss may be determined using a ProtoNCE function, described below. The E-M algorithm may determine that minimizing the ProtoNCE function is equivalent to maximizing the approximate likelihood function under the assumption that the data distribution around each prototype is an isotropic Gaussian. By using the E-M algorithm, the widely used instance discrimination task can be explained as a special case of the PCL framework, where the prototype for each instance is its augmented feature, and the Gaussian distribution around each prototype has the same fixed variance.

The embodiments of the disclosure are directed to the PCL framework for unsupervised representation learning. The learned representation not only preserves the local smoothness of each image instance, but also captures the hierarchical semantic structure of the global dataset. Further, although described with respect to images, the PCL framework may also apply to any type of unstructured data such as video, text, speech, etc.

The embodiments of the disclosure are directed to the PCL framework that includes an Expectation-Maximization (E-M) algorithm. In the E-M algorithm the iterative steps of clustering and representation learning can be interpreted as approximating and maximizing the log-likelihood function.

The embodiments of the disclosure are also directed to using the ProtoNCE function for determining the contrastive loss. Notably, the ProtoNCE function dynamically estimates the concentration for the feature distribution around each prototype. The learned prototypes contain more information about the image classes.

FIG. 1 is a simplified diagram of a computing device 100 for implementing a prototypical contrastive learning framework, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some embodiments, memory 120 may include non-transitory, tangible, machine readable media that includes executable code that when run by one or more processors (e.g., processor 110) may cause the one or more processors to perform the methods described in further detail herein. For example, as shown, memory 120 includes instructions for prototypical contrastive learning (PCL) framework 130 that may be used to implement and/or emulate the systems and models, and/or to implement any of the methods described further herein. The PCL framework 130 may be a "network" that may comprise any hardware or software-based framework that includes any artificial intelligence network or system, neural network or system and/or any training or learning models implemented thereon or therewith. The PCL framework 130 may include encoders that may be trained using images 140 (or other unstructured data such as video, speech, text, etc.) that the PCL framework 130 receives as input. The images 140 may comprise multiple pixels. Unlike conventional frameworks, the PCL framework 130 may be trained using images that do not include labels or tags that may identify different features of the images. After the PCL framework 130 is trained, an encoder in the PCL framework 130 may perform one or more tasks, e.g. identify a picture that is included in an image, determine image colorization, predict patch orderings, etc. In a non-structured data example, once trained an encoder in the PCL framework 130 may perform one or more tasks, namely generate clusters that include similar subsets of data in unstructured data.

Figure 2:
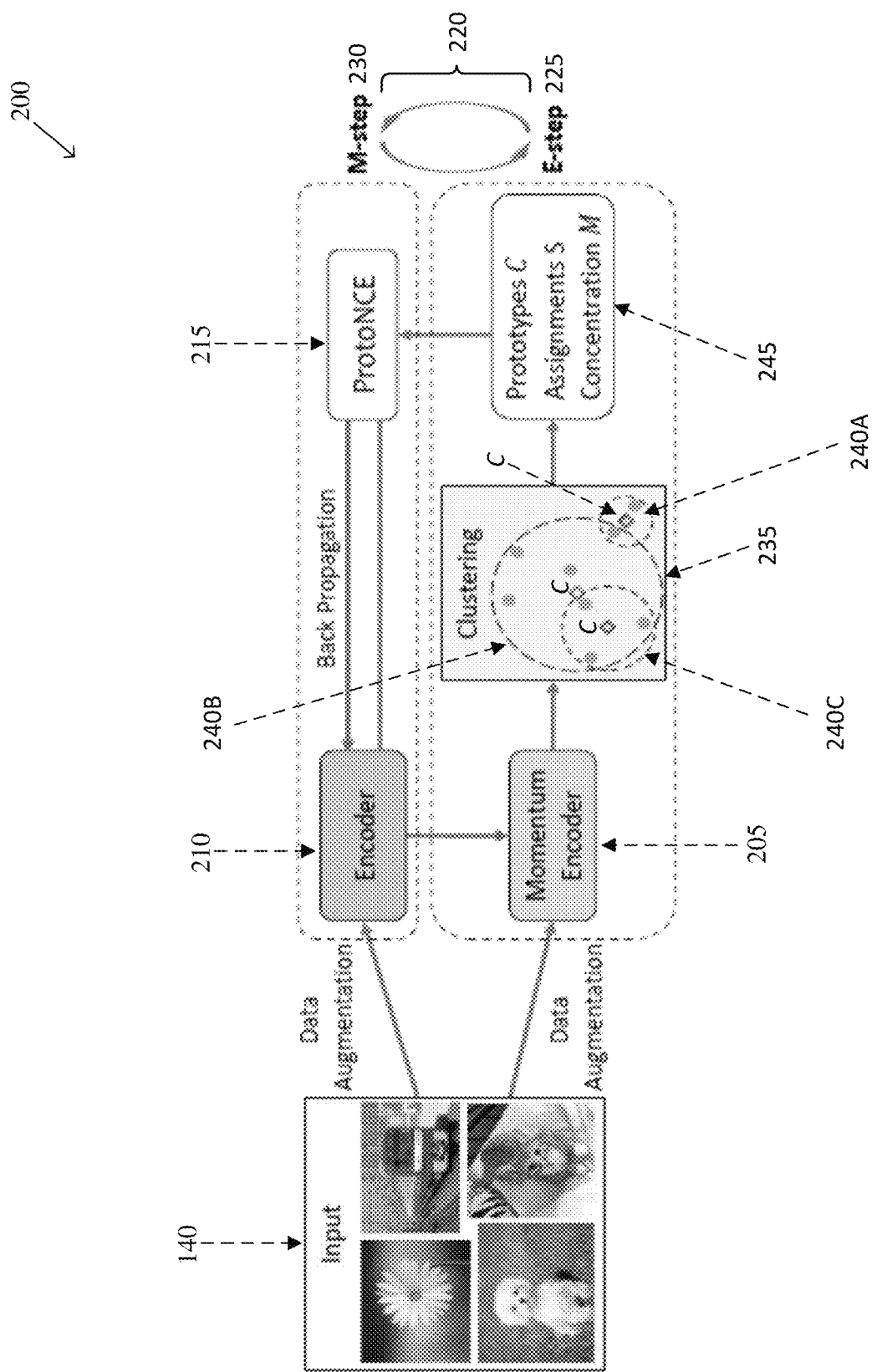
FIG. 2 is block diagram of a prototypical contrastive learning framework, according to some embodiments.

In some embodiments, the PCL framework 130 may be a neural network that includes one or more components. FIG. 2 is a block diagram 200 of a PCL framework according to some embodiments. The PCL framework 130 includes a momentum encoder 205, a clustering module 235, an encoder 210, and a ProtoNCE module 215. Some or all of momentum encoder 205, clustering module 235, encoder 210, and ProtoNCE module 215 may be structured as a neural network.

An expectation-maximization (E-M) algorithm 220 may act on the momentum encoder 205, clustering module 235, encoder 210, and ProtoNCE module 215. The E-M algorithm 220 may execute during multiple iterations that occur during a configurable time period called an epoch. Further, there may be multiple epochs during which the E-M algorithm 220 may execute and train encoder 210. The E-M algorithm 220 may be divided into an E-step 225 and a M-step 230, which are both performed at each iteration. In the E-step 225, the momentum encoder 205 may identify different features in images 140 and the clustering module 235 may generate a configurable number of clusters based on the identified features. Each cluster may include a prototype, assignment and concentration of the similar features in the images 140 and may have different levels of granularity. The M-step 230 may include the encoder 210 and ProtoNCE module 215 and may train the PCL framework 130. For example, the ProtoNCE module 215 may approximate and maximize a likelihood function that is back propagated to the encoder 210. Encoder 210 is trained using the likelihood function. The momentum encoder 205 is then updated with weights of the trained encoder 210. Both E-step 225 and M-step 230 of the E-M algorithm 220 are discussed in detail below.

Each of the momentum encoder 205 and encoder 210 may be a neural network, such as a convolutional neural network. Momentum encoder 205 and encoder 210 may be structural copies of each other. In other words, momentum encoder 205 and encoder 210 may be two instances of the same neural network, but may have different weights that are assigned to the nodes of the neural network.

As discussed above, during each iteration in the epoch, the E-M algorithm 220 performs the E-step 225 and the M-step 230. At the beginning of E-step 225, momentum encoder 205 receives one or more images 140 as input. In some instances, prior to the momentum encoder 205 receiving images 140, images 140 may be augmented, e.g. cropped, color changed, etc. Momentum encoder 205 passes the received images 140 though the neural network to determine the features of images 140. The features may be the output of the last layer of the convolutional neural network that makes up the momentum encoder 205. The features may be embeddings of the momentum encoder 205.

In some embodiments, clustering module 235 may receive the features that are the output of momentum encoder 205. Clustering module 235 may cluster the features into one or more clusters, such as clusters 240A-C. Each of the clusters 240A, 240B, and 240C may be associated with a prototype. Prototypes C are shown in FIG. 2 in the center of each cluster 240A-C. Each of the clusters 240A, 240B, and 240C includes features that are close or similar to each other. The prototypes C may have different granularity. For example, cluster 240B may have a coarse-grained prototype and clusters 240A and 240C may have a fine-grained prototype. The output 245 of clustering module 235 may be prototype C, assignment S, and concentration M for each cluster 240A-C. The prototype C may be a vector that identifies a center of a cluster, such as cluster 240A, 240B or 240C. Assignment S may identify which features are assigned to each cluster 240A, 240B and/or 240C. Concentration M estimates how close or tight the features are within each cluster 240A, 240B, and 240C. For example, concentration M in cluster 240A may indicate a tight concentration, while concentration M in cluster 240B may indicate a loose concentration. Notably, feature of the same image in images 140 may belong to different clusters 240A-C.

During the M-step 230, the ProtoNCE module 215 may receive output 245 that includes prototypes C, concentrations M, and assignments S for clusters 240A-C determined during the E-step 225. The ProtoNCE module 215 may use the prototypes C, concentrations M, and assignments S to optimize the ProtoNCE function shown in Equation 6 below. The ProtoNCE module 215 may determine that minimizing the ProtoNCE function is equivalent to maximizing the approximate likelihood function under the assumption that the data distribution around each prototype is an isotropic Gaussian. The optimized ProtoNCE function may be back propagated from ProtoNCE module 215 to encoder 210.

Encoder 210 may be trained using the ProtoNCE function determined by the ProtoNCE module 215 and the images 140. For example, encoder 210 may receive and process images 140 while applying the ProtoNCE function to the weights. As discussed above, the data in the images may be augmented. During training, the weights of the encoder 210 are trained. The trained weights of encoder 210 may then update the weights of the momentum encoder 205. Because the structures of encoder 210 and momentum encoder 205 are the same, the weights from encoder 210 may update the weights of momentum encoder 205 in the same position in the structure.

In some embodiments, the weights of the momentum encoder 205 may be updated by determining an average or a moving average of the weights of the momentum encoder 205 and the weights of encoder 210. Once the weights of momentum encoder 205 are updated, the PCL framework 130 may begin the next iteration in the epoch. During the next iteration, the PCL framework 130 may be trained using the same or different images 140 to determine clusters 240A-C, the prototypes C, concentrations M, and assignments S, that are then used to further optimize the ProtoNCE function.

The iterative process may continue for a preconfigured number of epochs. Once the iterative process discussed above is concluded, the momentum encoder 205 is trained and may be applied to perform various tasks.

Figure 3:
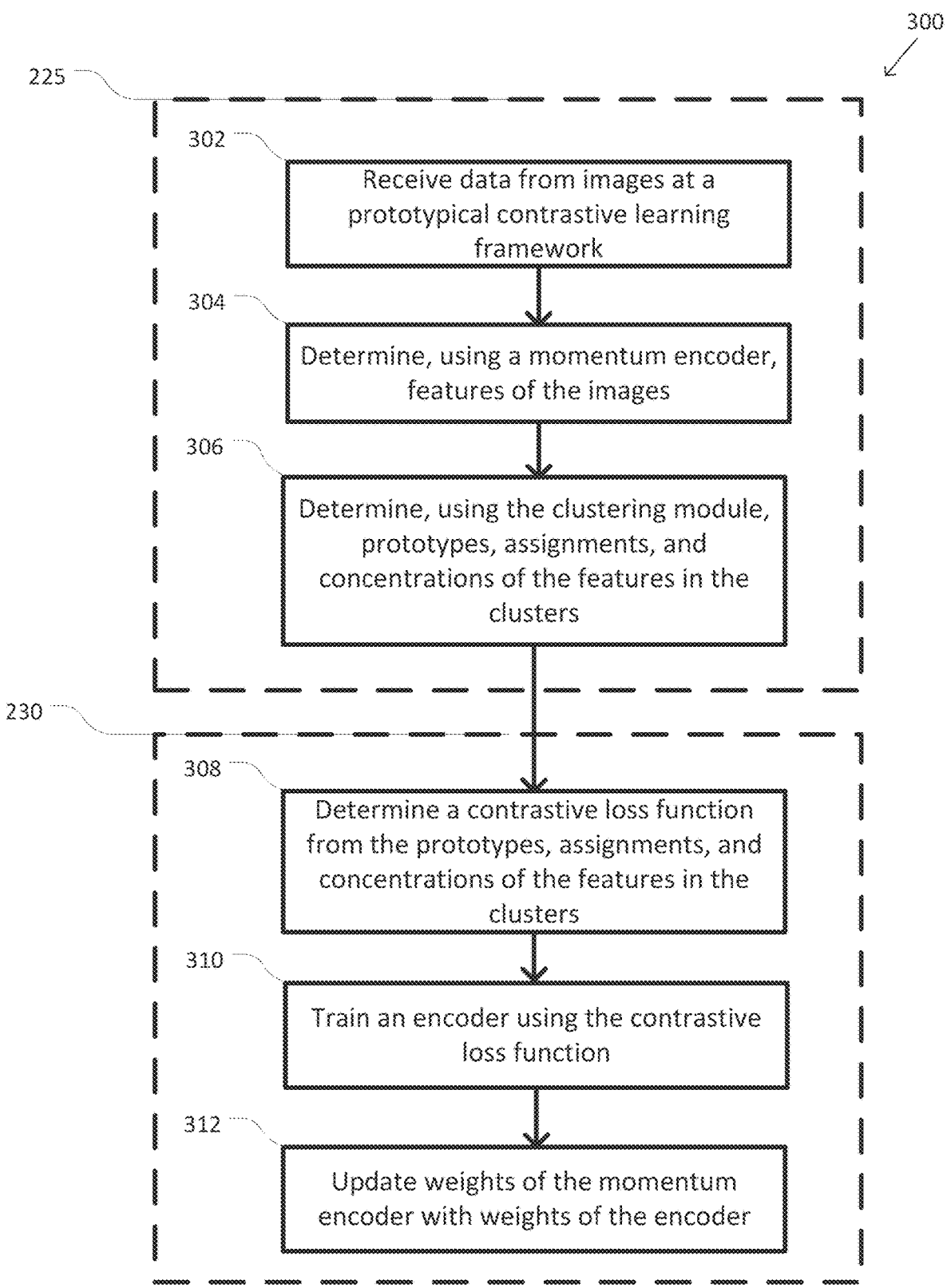
FIG. 3 is a flowchart of a method for training the prototypical contrastive learning framework, according to some embodiments.

FIG. 3 is a simplified diagram of a method 300 for training the PCL framework, according to some embodiments. One or more of the processes 302-312 of method 300 may be implemented, at least in part, in the form of executable code stored on non-transitory, tangible, machine-readable media that when run by one or more processors may cause the one or more processors to perform one or more of the processes 302-312. The processes 302-312 may be performed at each iteration of an epoch that may include a configurable number of iterations. Further, processes 302-306 may be performed as part of the E-step 225 of the E-M algorithm 220 and processes 308-312 may be performed as part of the M-step 230.

At process 302, data from the images is received. For example, momentum encoder 205 may receive data from one or more images 140. The data from images 140 may be cropped or otherwise augmented. The data may include pixels from images 140.

At process 304, features from the images are determined. For example, momentum encoder 205, which may be structured as a convolutional neural network, may generate embeddings which are features of images 140.

At process 306, prototypes, assignments and concentrations are determined from the features. For example, clustering module 235 may receive the features determined in process 304 and generate clusters, such as clusters 240A-C, using the features. From the clusters 240A-C, clustering module 235 may determine prototypes C, assignments S, and concentrations M of each cluster 240A, 240B, and 240C. In some embodiments, the number of clusters that clustering module 235 may determine is preconfigured, and clustering module 235 determines which features are included in which one or more clusters 240A-240C.

At process 308, a ProtoNCE function is determined. For example, the ProtoNCE module 215 receives the prototypes C, assignments S, and concentration M and determines the ProtoNCE function that minimizes a proposed contrastive loss. For example, ProtoNCE module 215 may determine the ProtoNCE function by maximizing the approximate likelihood function under the assumption that the data distribution around each prototype is an isotropic Gaussian.

At process 310, an encoder is trained. For example, encoder 210 is trained using the embedding function determined in step 308 and all or a subset of images 140. Like momentum encoder 205, encoder 210 may also receive images 140. During training, the contrastive loss function may be applied to the one or more weights of the nodes in the convolution neural network included in the encoder 210 as the encoder determines features of images 140.

At process 312, the momentum encoder is updated. For example, momentum encoder 205 may be updated with the weights of encoder 210. In some embodiments, momentum encoder 205 may be updated with an average of the weights of momentum encoder 205 and weights of encoder 210. In other embodiments, momentum encoder 205 may be updated with a moving average of the weights by taking an arithmetic mean of the weights of momentum encoder 205 at previous iterations and the weights received from encoder 210.

After process 312 completes, method 300 may repeat another iteration of processes 302-312 until the iterations complete the epoch. At completion of an epoch, the method 300 may repeat for another epoch or for a configurable number of epochs. Once the PCL framework 130 completes training, encoder 210 may be included in other frameworks, including other image processing frameworks to perform different tasks.

Going back to FIG. 2, the embodiments below, describe the mathematical framework included in various components of the PCL framework 130. As discussed above, the PCL framework 130 may be trained using images 140. Given a training set $X=\{x_1, x_2, \ldots, x_N\}$ of N images, which may be images 140, the unsupervised visual representation learning aims to learn an embedding function $f_\theta$ (realized via a DNN) that maps X to $V=\{v_1, v_2, \ldots, v_N\}$ with $v_i=f_\theta(x_i)$, such that $v_i$ best describes $x_i$.

The instance-wise contrastive learning may achieve this objective by optimizing a contrastive loss function, such as an InfoNCE function. The InfoNCE function may be defined as:

$$\mathcal{L}_{InfoNCE} = \sum_{i=1}^{N} -\log \frac{\exp(v_i \cdot v'_i / \tau)}{\sum_{j=0}^{r} \exp(v_i \cdot v'_j / \tau)}, \qquad \text{Equation 1}$$

where $v_i'$ is a positive embedding for instance i, $v_j'$ includes one positive embedding, r is negative embeddings for other instances, and $\tau$ is a temperature hyper-parameter. These embeddings are obtained by feeding $x_i$ to momentum encoder 205 parametrized by $\theta'$, $v_i'=f_{\theta'}(x_i)$, where $\theta'$ is a moving average of $\theta$.

In the PCL framework 130, the prototypes c may replace v and a concentration estimation $\mu$ (shown as concentration M in FIG. 2) may replace the fixed temperature hyper-parameter $\tau$. Further, the clustering and representation learning may be performed iteratively at each epoch.

The PCL framework 130 may find the network parameters $\theta$ that maximizes the likelihood function of the observed n samples:

$$\theta^* = \underset{\theta}{\arg\max} \sum_{i=1}^{n} \log p(x_i; \theta) \qquad \text{Equation 2}$$

Further, the observed data $\{x_i\}_{i=1}^n$ is related to the latent variable $C=\{c_i\}_{i=1}^K$ which denotes the prototypes C of the data. In this way, the likelihood function may be re-written as:

$$\theta^* = \underset{\theta}{\arg\max} \sum_{i=1}^{n} \log p(x_i; \theta) = \underset{\theta}{\arg\max} \sum_{i=1}^{n} \log \sum_{c_i \in C} p(x_i, c_i; \theta) \qquad \text{Equation 3}$$

In order to optimize the function in Equation 3, the PCL framework 130 may use a surrogate function to lower-bound Equation 3, as follows:

$$\sum_{i=1}^{n} \log \sum_{c_i \in C} p(x_i, c_i; \theta) = \qquad \text{Equation 4}$$

$$\sum_{i=1}^{n} \log \sum_{c_i \in C} Q(c_i) \frac{p(x_i, c_i; \theta)}{Q(c_i)} \geq \sum_{i=1}^{n} \sum_{c_i \in C} Q(c_i) \log \frac{p(x_i, c_i; \theta)}{Q(c_i)}$$

where $Q(c_i)$ denotes some distribution over c's ($\sum_{c_i \in C} Q(c_i) = 1$), and the last step of derivation uses Jensen's inequality. Further, to make the inequality hold with equality, the PCL framework 130 may require for $$\frac{p(x_i, c_i; \theta)}{Q(c_i)}$$

to be a constant. In this case:

$$Q(c_i) = \frac{p(x_i, c_i; \theta)}{\sum_{c_i \in C} p(x_i, c_i; \theta)} = \frac{p(x_i, c_i; \theta)}{p(x_i; \theta)} = p(c_i; x_i, \theta) \qquad \text{Equation 5}$$

Further, by ignoring the constant $-\sum_{i=1}^n \sum_{c_i \in C} Q(c_i) \log Q(c_i)$ in Equation 4, the PCL framework 130 may maximize:

$$\sum_{i=1}^{n} \sum_{c_i \in C} Q(c_i) \log p(x_i, c_i; \theta) \qquad \text{Equation 6}$$

During the E-step 225 of the E-M algorithm 220, the PCL framework 130 aims to estimate $p(c_1; x_i, \theta)$. To achieve this, the clustering module 235 may perform k-means clustering on the features $v_i'=f_{\theta'}(x_i)$ of images 140 identified by momentum encoder 205 to obtain k clusters. Prototype $c_i$ may be defined as cluster centroid for the i-the cluster. Then the clustering module 235 computes $p(c_i; x_i, \theta) = \mathbb{1}(x_i \in c_i)$, where $\mathbb{1}(x_i \in c_i)=1$ if $x_i$ belongs to the cluster represented by $c_i$. Otherwise $\mathbb{1}(x_i \in c_i)=0$.

During the M-step 230, the ProtoNCE module 215 maximizes the lower-bound of Equation 6 as follows:

$$\sum_{i=1}^{n}\sum_{c_i \in C} Q(c_i)\log p(x_i, c_i; \theta) = \sum_{i=1}^{n}\sum_{c_i \in C} Q(c_i; x_i, \theta)\log p(x_i, c_i; \theta) =$$

$$\sum_{i=1}^{n}\sum_{c_i \in C} \mathbb{1}(x_i \in c_i)\log p(x_i, c_i; \theta)$$

Equation 7

Under the assumption of a uniform prior over cluster centroids, the $p(x_i, c_i; \theta)$ may be represented as follows:

$$p(x_i, c_i; \theta) = p(x_i; c_i, \theta)p(c_i; \theta) = \frac{1}{k} \cdot p(x_i; c_i, \theta)$$

Equation 8 where the prior probability $p(c_1; \theta)$ for each $c_i$ is set to $$\frac{1}{k}.$$

In some embodiments, the distribution around each prototype is an isotropic Gaussian, which leads to:

$$p(x_i; c_i, \theta) = \exp\left(\frac{-(v_i - c_s)^2}{2\sigma_s^2}\right) \Big/ \sum_{j=1}^{k} \exp\left(\frac{-(v_i - c_j)^2}{2\sigma_j^2}\right)$$

Equation 9 where $v_i = f_\theta(x_i)$ and $x_i \in c_s$. If the ProtoNCE module 215 applies the $l_2$-normalization to both v and c, then $(v-c)^2 = 2 - 2v \cdot c$. Combining Equations 3, 4, 6, 7, 8, and 9, the maximum log-likelihood estimation may be written as:

$$\theta^* = \underset{\theta}{\text{argmin}} \sum_{i=1}^{N} -\log \frac{\exp\left(v_i \cdot \frac{c_s}{u_s}\right)}{\sum_{j=1}^{k}\exp\left(v_i \cdot \frac{c_j}{u_j}\right)}$$

Equation 10 which is in the same form as the InfoNCE loss in Equation 1. Here $\mu \propto \sigma^{-2}$ denotes the concentration level of the feature distribution around a prototype (smaller $\mu$ means more concentrated distribution). Therefore, instance-wise contrastive learning can be interpreted as a special case of prototypical contrastive learning, where the prototypes are instance features (i.e. C=V'), and the concentration of the distribution around each instance is the same (i.e. $\mu = \tau$).

The ProtoNCE module 215 may sample r negative prototypes to calculate the normalization term. ProtoNCE module 215 may cluster samples M times with different number of clusters $K=\{k_m\}_{m=1}^{M}$, which has a more robust probability estimation of prototypes that encode the hierarchical structure. Furthermore, a loss to instance discrimination may be added to retain the property of local smoothness. The ProtoNCE function used by the ProtoNCE module 215 to determine ProtoNCE loss may be defined as:

$$\mathcal{L}_{ProtoNCE} = \sum_{i=1}^{N} -$$

Equation 11

-continued $$\left(\log \frac{\exp(v_i \cdot v_i'/\tau)}{\sum_{j=0}^{r}\exp(v_i \cdot v_j'/\tau)} + \frac{1}{M}\sum_{m=1}^{M}\log\frac{\exp(v_i \cdot c_s^m/\mu_s^m)}{\sum_{j=0}^{r}\exp(v_i \cdot c_j^m/\mu_j^m)}\right)$$

As illustrated in FIG. 2, the distribution of embeddings around each prototype c has different level of concentration. $\mu$ may denote the concentration estimation (concentration M), where a smaller $\mu$ indicates larger concentration. Here $\mu$ may be calculated using the momentum features $\{v_z'\}_{z=1}^{Z}$ that are within the same cluster as a prototype c. The desired $\mu$ should be small (high concentration) if (1) the average distance between $v_z'$ and c is small, and (2) the cluster contains more feature points (i.e. Z is large). Therefore, $\mu$ may be defined as:

$$\mu = \frac{\sum_{z=1}^{Z}\|v_z' - c\|_2}{Z\log(Z+\alpha)},$$

Equation 12 where $\alpha$ is a smooth parameter to ensure that small clusters do not have an overly large $\mu$. Also $\mu$ may be normalized for each set of prototypes $C^m$ such that they have a mean of $\tau$.

Figure 4:
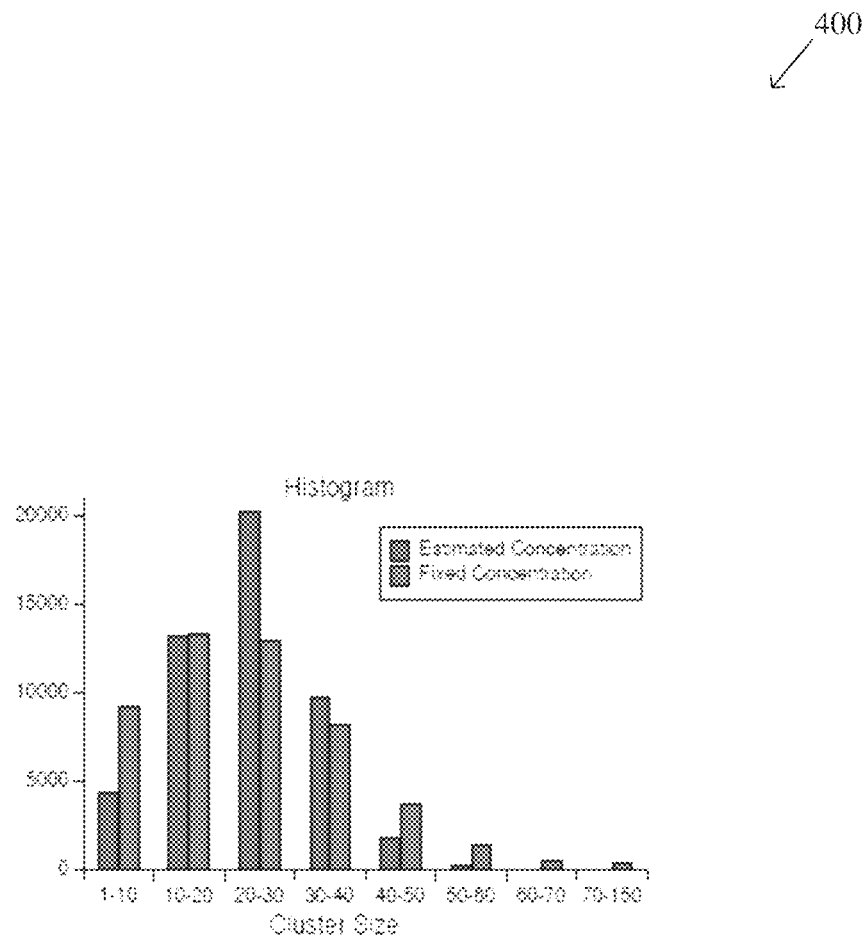
FIG. 4 is a diagram of a histogram illustrating cluster sizes in a prototypical contrastive learning framework with fixed and estimated concentrations, according to some embodiments.

In some embodiments, in the ProtoNCE loss (Equation 11), $\mu_s^m$ LT acts as a scaling factor on the similarity between an embedding $v_i$ and its prototype $c_s^m$. With the proposed the similarity for embeddings in a loose cluster (lager $\mu$) are down-scaled, pulling them closer to the prototype. On the contrary, embeddings in a tight cluster (smaller $\mu$) have an up-scaled similarity, thus less encouraged to approach the prototype. Therefore, representation learning with the ProtoNCE function yields more balanced clusters with similar concentration. This prevents a trivial solution where most embeddings collapse to a single cluster, a problem that could only be heuristically addressed by data-resampling in Deep-Cluster. FIG. 4 is a histogram 400 of a cluster size for prototypical contrastive learning for 50000 clusters with a fixed and estimated concertation Histogram 400 illustrates that using a different concertation $\mu$ for each prototype yields more balanced clusters with similar sizes, which leads to better representation learning.

In some embodiments, minimizing the proposed ProtoNCE loss may be considered as simultaneously maximizing the mutual information between V and all the prototypes $\{V', C^1, \ldots, C^M\}$. This leads to better representation learning, for two reasons. First, the encoder 210 may learn the shared information among prototypes and ignore the individual noise that exists in each prototype. The shared information is more likely to capture higher-level semantic knowledge. Second, when compared to instance features, prototypes have a larger mutual information (MI) with the class labels. Furthermore, training the encoder 210 using the ProtoNCE loss function may increase the MI between the instance features (or their assigned prototypes) and the ground-truth class labels for all images in a training dataset.

In some embodiments, the PCL framework 130 can provide more insights into the nature of the learned prototypes. The optimization in Equation 10 is similar to optimizing the cluster-assignment probability $p(s; x_i, \theta)$ using the cross-entropy loss, where the prototypes c represent weights for a linear classifier. With k-means clustering, the linear classifier has a fixed set of weights as the mean vectors for the representations in each cluster, $$c = \frac{1}{Z}\sum_{z=1}^{Z} v'_z.$$

A similar idea has been used for few-shot learning, where a non-parametric prototypical classifier performs better than a parametrized linear classifier.

In some embodiments, the PCL framework 130 may be trained using the ImageNet-1M dataset, which contains approximately 1.28 million images in 1000 classes. Momentum encoder 205 or encoder 210 may be a ResNet-50, whose last fully-connected layer outputs a 128-D and L2-normalized feature. PCL framework 130 may perform data augmentation on images 140 with random crop, random color jittering, random horizontal flip, and random grayscale conversion. The PCL framework 130 may use a SGD as an optimizer, with a weight decay of 0.0001, a momentum of 0.9, and a batch size of 256. The PCL framework 130 may train for 200 epochs, where the PCL framework 130 may warm-up the network in the first 20 epochs by only using the InfoNCE loss. The initial learning rate is 0.03 and may be multiplied by 0.1 at 120 and 160 epochs. In terms of the hyper-parameters, we set $\tau=0.1$, $\alpha=10$, and number of clusters K={25000, 50000, 100000}. We use the GPU k-means implementation in faiss which takes approximately 10 seconds. The clustering is performed every epoch, which introduces 219 ⅓ computational overhead due to a forward pass through the dataset. The number of negatives for ProtoNCE module 213 is set as k=16000.

FIG. 5 is a diagram of an E-M algorithm for training the prototypical contrastive learning framework, according to some embodiments. In FIG. 5, algorithm 1 (E-M algorithm 220) includes pseudo-code for prototypical contrastive learning.

At line 1, algorithm 1 receives input which includes an encoder function $f_\theta$, the training dataset X which could be images 140 or other unstructured data, and a number of clusters $K=\{k_m\}_{m=1}^M$.

At line 2, a momentum encoder 205 is initialized to θ, which may be the weights of encoder 210.

At line 3, a number of epoch are initialized using the MaxEpoch variable.

At line 4, the momentum features V' from the training dataset X are generated using the momentum encoder 210.

At lines 4-8 the E-step 225 is performed, where the clustering module 235 clusters V' features into $k_m$ clusters, returns prototypes $C^m$ (lines 6) and estimates the concentration distribution $u_m$ around each prototype using Equation 12 (line 7).

At liens 9-14 and M-step 230 is performed. In the M-step 230, the images 140 (or other unstructured data) in the training dataset X may be loaded in minibatches and passed through encoder 210 and momentum encoder 205 at lines 10. The ProtoNCE module 215 determines a loss function using the features from the encoder 210 and momentum encoder 205 at line 11 and as shown in Equation 11. At line 12, the encoder 210 is trained using the loss function which updates the weights of the encoder 210. At line 13, the weights of the momentum encoder 205 are updated with the weights of the encoder 210.

Figure 6:
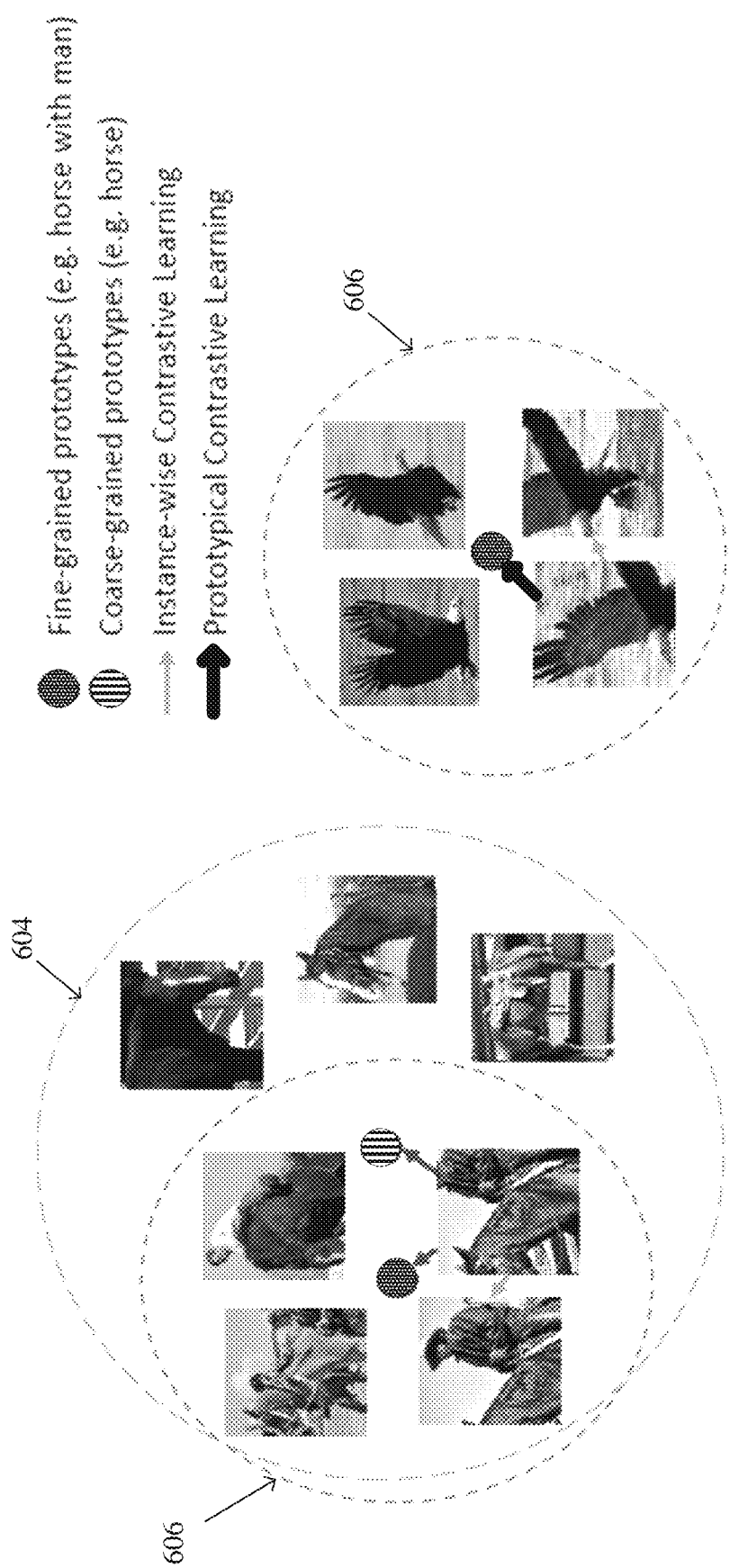
FIG. 6 is a diagram that illustrates clustering in the E-step of the Expectation-Maximization algorithm, according to some embodiments.

FIG. 6 is a diagram that illustrates clustering in the E-step of the E-M algorithm, according to some embodiments. FIG. 6 illustrates three clusters. Cluster 602 is a fine-grained cluster that includes images of a horse and a man. Cluster 604 is a coarse-grained cluster that includes images of a horse. Clusters 602 and 604 overlap as both include images of a horse ad different levels of granularity. Cluster 606 is a coarse-grained cluster that includes images of an eagle. Notably, cluster 606 does not overlap with clusters 602 and 606 as the images do not have common features.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "Unsupervised Representation Learning with Contrastive Prototypes," 14 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a prototypical contrastive learning (PCL) framework, comprising:
   receiving unstructured data at a momentum encoder of the PCL framework;

determining, using the momentum encoder, features from the unstructured data;

clustering, using the momentum encoder, the unstructured data into a number of clusters according to the features;

determining prototypes, assignments, and concentrations of the clusters, a prototype, an assignment, and a concentration for each cluster in the clusters;

determining, a contrastive loss function of the PCL framework from the prototypes, the assignments, and the concentrations of the clusters;

training an encoder of the PCL framework using the contrastive loss function and a subset of unstructured data; and updating the momentum encoder using weights of the encoder.

2. The method of claim 1, wherein the trained encoder is configured to determine second cluster for second unstructured data.

3. The method of claim 1, wherein the momentum encoder and the encoder are convolutional neural networks.

4. The method of claim 3, wherein a neural network structure of the momentum encoder is the same as a neural network structure of the encoder.

5. The method of claim 1, wherein the updating further comprises:

updating weights of the momentum encoder with the weights of the encoder.

6. The method of claim 5, wherein the updated weights of the momentum encoder are a moving average of the weights of the momentum encoder and the weights of the encoder.

7. The method of claim 1, wherein the momentum encoder is updated at each iteration in an epoch.

8. The method of claim 1, wherein the updated momentum encoder is trained to perform at least one task associated with processing the unstructured data.

9. The method of claim 1, wherein the encoder is trained and the momentum encoder is updated over a configurable number of iterations.

10. A system for training a prototypical contrastive learning (PCL) framework, comprising:

a momentum encoder configured to:
 receive images; and
 determine features from the images;

a clustering module configured to:
 cluster the images into a number of clusters according to the features;
 determine prototypes, assignments, and concentrations of the clusters, a prototype, an assignment, and a concentration for each cluster in the clusters;

a ProtoNCE modules configured to determine, a contrastive loss function of the PCL framework from the prototypes, the assignments, and the concentrations of the clusters; and an encoder configured to:
 process a subset of the images using the contrastive loss function; and
 update the momentum encoder using weights of the encoder.

11. The system of claim 10, wherein the encoder is configured to determine second cluster for second images.

12. The system of claim 10, wherein the momentum encoder and the encoder are convolutional neural networks.

13. The system of claim 12, wherein a neural network structure of the momentum encoder is the same as a neural network structure of the encoder.

14. The system of claim 10, wherein the encoder is further configured to update weights of the momentum encoder with the weights of the encoder.

15. The system of claim 14, wherein the updated weights of the momentum encoder are a moving average of the weights of the momentum encoder and the weights of the encoder.

16. The system of claim 10, wherein the momentum encoder is updated at each iteration in an epoch.

17. The system of claim 10, wherein the updated momentum encoder is trained to perform at least one task associated with processing an image.

18. The system of claim 10, wherein the encoder is trained and the momentum encoder is updated over a configurable number of iterations.

19. A non-transitory machine-readable medium having stored thereon machine-readable instructions executable to cause a machine to perform operations for training a prototypical contrastive learning (PCL) framework, the operations comprising:

receiving unstructured data at a momentum encoder of the PCL framework;

determining, using the momentum encoder, features from the unstructured data;

clustering, using the momentum encoder, the unstructured data into a number of clusters according to the features;

determining prototypes, assignments, and concentrations of the clusters, a prototype, an assignment, and a concentration for each cluster in the clusters;

determining, a contrastive loss function of the PCL framework from the prototypes, the assignments, and the concentrations of the clusters;

training an encoder of the PCL framework using the contrastive loss function and a subset of unstructured data; and updating weights of the momentum encoder using weights of the encoder.

20. The non-transitory machine-readable medium of claim 19, wherein a neural network structure of the momentum encoder is the same as a neural network structure of the encoder.

* * * * *